Figures 1, 3, 6:
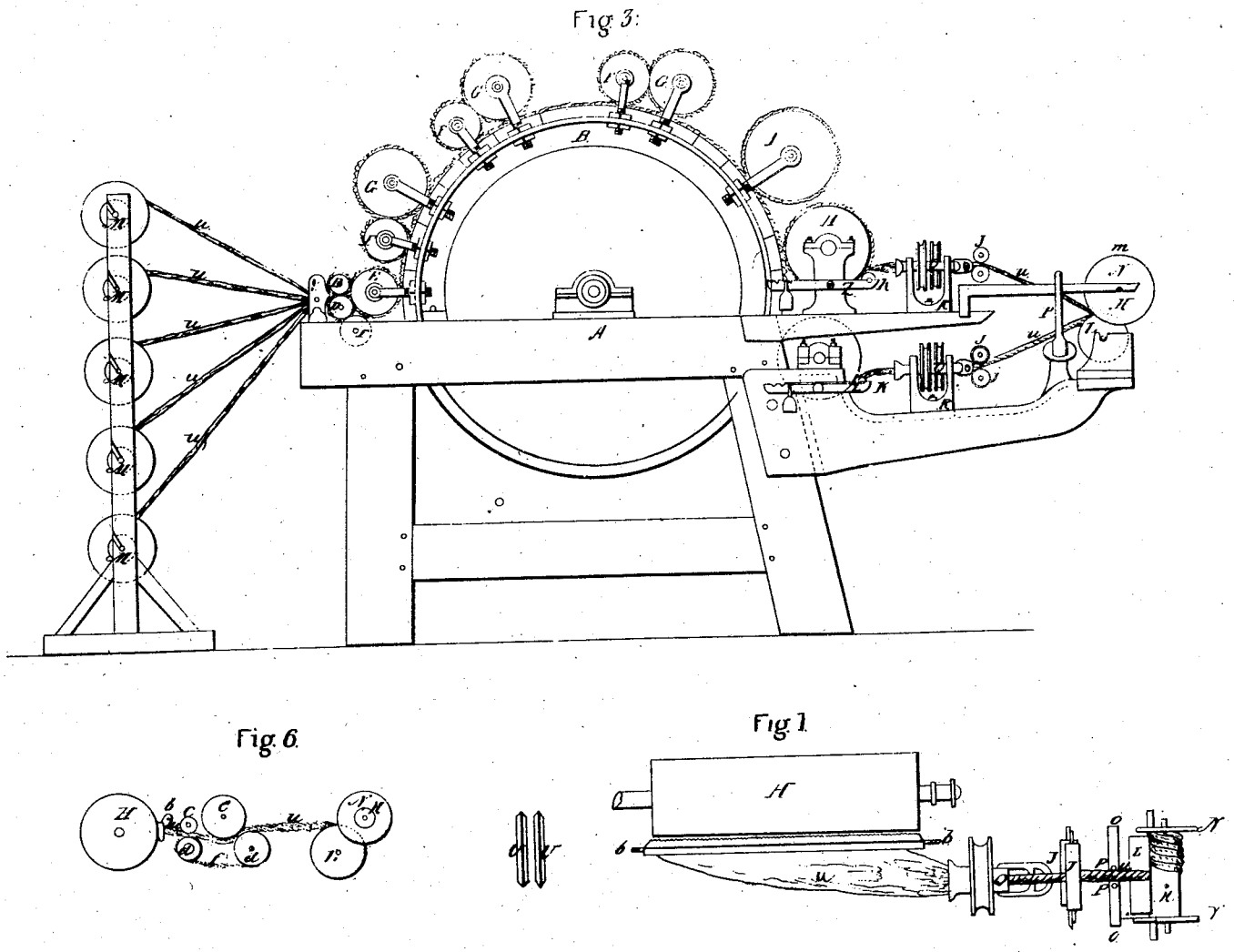
Figure 4:
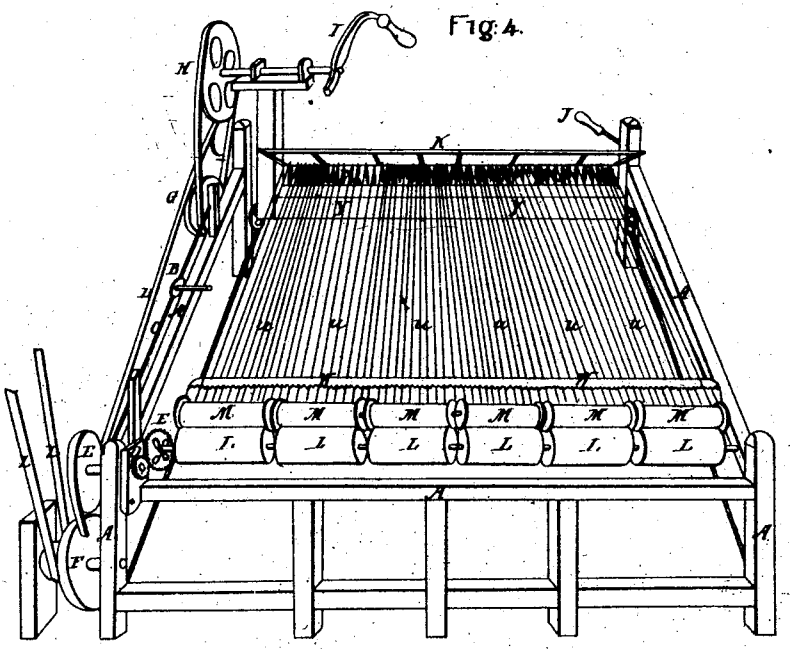
Figure 5:
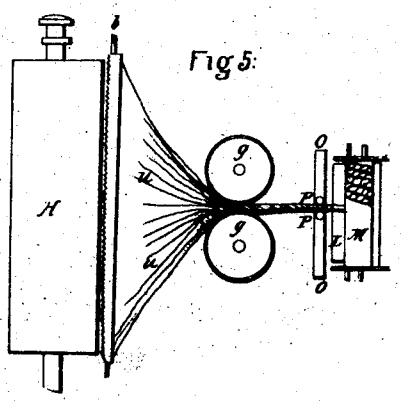
Figure 2:
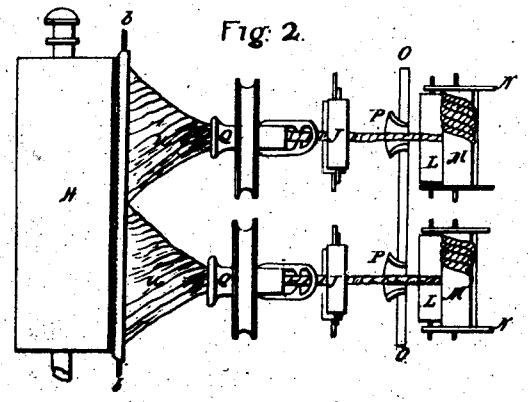
Figure 7:
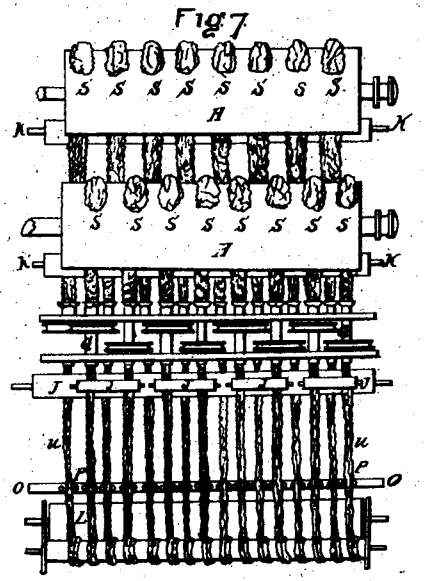

NO PRINTED SPECIFICATION AVAILABLE.

2 Sheets. Sheet 1.

4605X

J Goulding,

Carding Machine.

No.

Patented Dec. 15, 1826.

NO PRINTED SPECIFICATION AVAILABLE.

2 Sheets. Sheet 2.

4605X

J. Goulding,
Carding Machine.

No.

Patented Dec. 15, 1826.

United States Patent Office

PTO - BOYERS, PA Duty Station

MISSING PAGE TEMPORARY NOTICE

PATENT # 4605X FOR ISSUE DATE 12-15-1826 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa